Aug. 31, 1943.  H. NUTT ET AL  2,328,090
CLUTCH SYSTEM
Filed May 23, 1938  5 Sheets-Sheet 1

Inventors:
Harold Nutt and
Harold V. Reed.
By: Edward C. Fitzbaugh
Atty.

Aug. 31, 1943.  H. NUTT ET AL  2,328,090
CLUTCH SYSTEM
Filed May 23, 1938  5 Sheets-Sheet 4

Inventors:
Harold Nutt and
Harold V. Reed.
By Edward C. Fitzbaugh
Atty.

Aug. 31, 1943.   H. NUTT ET AL   2,328,090
CLUTCH SYSTEM
Filed May 23, 1938   5 Sheets-Sheet 5

Inventors:
Harold Nutt and
Harold V. Reed.
By Edward C. Fitzbaugh
Atty.

Patented Aug. 31, 1943

2,328,090

UNITED STATES PATENT OFFICE 2,328,090

CLUTCH SYSTEM

Harold Nutt and Harold V. Reed, Chicago, Ill., assignors to Borg-Warner Corporation, Chicago, Ill., a corporation of Illinois Application May 23, 1938, Serial No. 209,450

41 Claims. (Cl. 192—3.5)

Our invention relates to improvements in automatic clutch systems, particularly to a so-called engine or main clutch of the centrifugal type, adapted for use in connection with an automatic or semi-automatic transmission, and has as its general object to provide a hydraulic or fluid-operated clutch system adapted to operate automatically in connection with an automatic or semi-automatic transmission.

Another object of the invention is to provide an automatic, fluid-operated clutch, adapted, when the transmission is adjusted to starting range (including the gear ratios commonly known as "low" and "reverse") to be engageable and disengageable at engine speeds corresponding to relatively low travelling speeds, and adapted, on the other hand, when the transmission is adjusted to driving range (including the gear ratios of intermediate and high), to be "locked out" against automatic release, so that the vehicle may travel at relatively low speed (such, for example, as five to eight miles per hour) in high gear without slippage of the clutch.

While it is desirable to have the automatic clutch "locked out" when the transmission is adjusted to the driving range, we find that in practice such an arrangement creates a problem in connection with rapid stopping of the vehicle. There is a certain time interval of delay in the operation of the speed-responsive control device that is employed to determine the vehicle speed at which a shift in driving ratio in an automatic or semi-automatic transmission is to take place. If this device is set so as to complete the change from starting gear ratio to the next higher ratio at a vehicle speed of, for example, between six and eight miles per hour, the change must be initiated at a lower speed, as for example, between four and six miles per hour. On shifting back from the higher ratio to the lower ratio, however, during deceleration of the vehicle, the change, initiated in the speed range of from four to six miles per hour, will not be completed until a still lower speed has been reached. On a very quick stop, it will thus be possible to stall the engine if the transmission governor is relied upon for the purpose of releasing the clutch.

Our invention aims to remedy this difficulty by providing means, effective much more rapidly than the transmission governor, for releasing the main clutch when the engine speed drops below a predetermined rate. In this respect, the invention contemplates, in one aspect, the employment of a centrifugal release valve, responsive directly to engine speed, for releasing the fluid pressure which operates to engage the clutch.

Another object of the invention, in this connection, is to provide auxiliary release means, manually operable, for quickly releasing the fluid pressure in the clutch operating mechanism. The manual control may be one in which a connection is made directly to the brake pedal of the motor vehicle, as disclosed in our co-pending application Serial No. 191,986, filed February 23, 1938, now Patent No. 2,230,050, dated January 28, 1941, or it may be any other type of manual control, such as an independent foot lever or a hand lever or button. The invention also contemplates, in this respect, the provision of means whereby the clutch may be controlled manually in the conventional manner, independently of the automatic control.

The invention contemplates the employment of fluid pressure-responsive means for adjusting the centrifugal mechanism of the clutch to its speed-responsive and lockup positions respectively, and two fluid pumps, one driven by the driving mechanism and controlling the movement of said means to the speed-responsive positions, and the other driven by the transmission and controlling the movement of said means to the lockup position.

The invention also contemplates an arrangement for diversion of fluid from the transmission pump into the channel which normally delivers fluid from the engine pump, when the latter is not in operation, so that the clutch may be engaged for "push" starting. Except during the latter operation, the streams of fluid from the respective pumps are maintained separated in the pressure zones.

The arrangement of the one pump to be driven by the driven mechanism rearwardly of the clutch makes it possible for the same to be controlled in accordance with the operation of the transmission, and the arrangement of the other pump to be driven by the drive mechanism ahead of the clutch makes it possible for the clutch to become operative in its speed-responsive position when the engine is running and the vehicle is stationary.

A further object of the invention is to provide, in connection with a conventional type of centrifugal clutch, including centrifugal control elements, an arrangement whereby excess pressure of said control elements at high speed may be compensated for so as to avoid over-loading of the mechanism. In this respect the invention contemplates the employment of a fluid operated actuating member or piston which is adapted to recede against the fluid pressure developed by the aforementioned pumps, or one of them, under excessive centrifugal pressure developed by said control elements.

Other objects, the advantages and uses of the invention will become apparent after reading the following specification and claims, and after consideration of the drawings forming a part of the specification, wherein:

Figure 1:
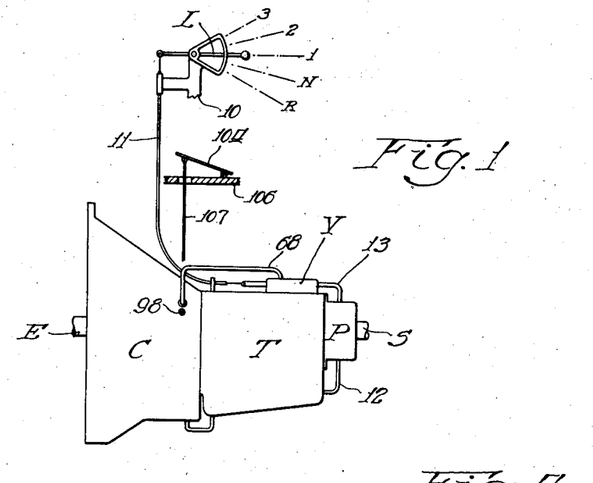
Fig. 1 is a schematic view of a motor vehicle drive mechanism embodying the invention.

Both forms of the invention shown in the drawings as illustrative of constructions in which the invention may be embodied, may include, as shown schematically in Fig. 1, an engine clutch C, a transmission T, which may be either of an automatic or semi-automatic or manually-operated type, a transmission pump P for supplying fluid under pressure for operating the shifting mechanism of the transmission, a valve V for controlling the flow of fluid from the transmission pump P to the various operating mechanisms for effecting changes in gear ratio in the transmission, and a manual control lever L, mounted on the steering post 10, or any other convenient portion of the vehicle, and connected by a Bowden wire 11 to the valve V for controlling the setting thereof. Since the details of construction of the transmission T, the pump P, and the valve V do not in themselves form part of the present invention, they are not illustrated. Any of the known types of automatic or semi-automatic transmissions, in which change of gear ratio is effected by fluid pressure generated by a pump driven by the drive mechanism of the vehicle rearwardly of the main clutch, and controlled by any type of control mechanism, whether manually controlled or otherwise, adapted to direct the fluid pressure generated by such pump in such manner as to effect setting of the gear ratio of the transmission in either neutral, starting range (including commonly termed reverse and low gear ratios) or driving range (including the commonly termed intermediate and high gear ratios) may be employed as part of the structure in which the present invention may be embodied.

The main clutch C in the present invention serves to connect the engine shaft E to the transmission driven shaft S when the transmission is adjusted to any gear ratio except neutral, and to be completely disengaged so that there will be no driving connection between the engine shaft E and the shaft S when the transmission is adjusted to neutral position. More specifically, the engine clutch C is adapted to connect the engine shaft E to the driven shaft S for speed-responsive clutch action in the starting range, so as to be disengaged at engine speeds below a predetermined rate, and to become engaged when the engine speed exceeds that rate. When the transmission is adjusted to driving range, the clutch C is adapted to become "locked up" against disengagement, so as to avoid any possibility of clutch slippage during normal driving conditions. It will be understood, therefore, that the transmission T may be of a type adapted to effect change from intermediate to high gear ratio, and vice versa, without the necessity of the main clutch C being disengaged during the shift. Such transmissions are known and need not be more fully described herein.

The several positions of the lever L corresponding to the several gear ratio adjustments of the transmission T, are indicated in Fig. 1 by the reference characters R, denoting reverse gear, N, denoting neutral position, I, denoting low or first gear ratio, 2, denoting second or intermediate gear ratio, and 3, denoting third or high gear ratio. It will be understood that in each of these positions of the lever, the valve V will be adjusted to a setting such as to direct the fluid pressure from the pump P in the proper manner to effect adjustment of the transmission to the corresponding gear ratio.

The pump P may receive its supply of fluid, such as transmission oil, through a tube 12 communicating with a reservoir in the lower region of the transmission T, and may deliver such oil under pressure to the valve V through a tube 13. From the valve V the oil may be directed in accordance with the position of the valve, through the bottom of the valve and into the transmission on which the valve is directly mounted.

For convenience in reference, the mechanism ahead of the clutch C, by which the clutch is driven, such as the engine (which is not illustrated), and the engine shaft E, may be designated as the driving portion of the vehicle drive mechanism and the mechanism rearwardly of the clutch C, including the transmission drive shaft S' (see Fig. 2), on which the driven member 14 of the engine clutch C is affixed, and including the transmission T, the transmission driven shaft S, etc., may be referred to as the driven mechanism. In accordance with the present invention, the pump P is driven by some portion of the driven mechanism, a convenient arrangement being to secure the pump P to the rear end of the housing of the transmission T, receiving the shaft S, and driven thereby, as shown in Fig. 1.

Figure 2:
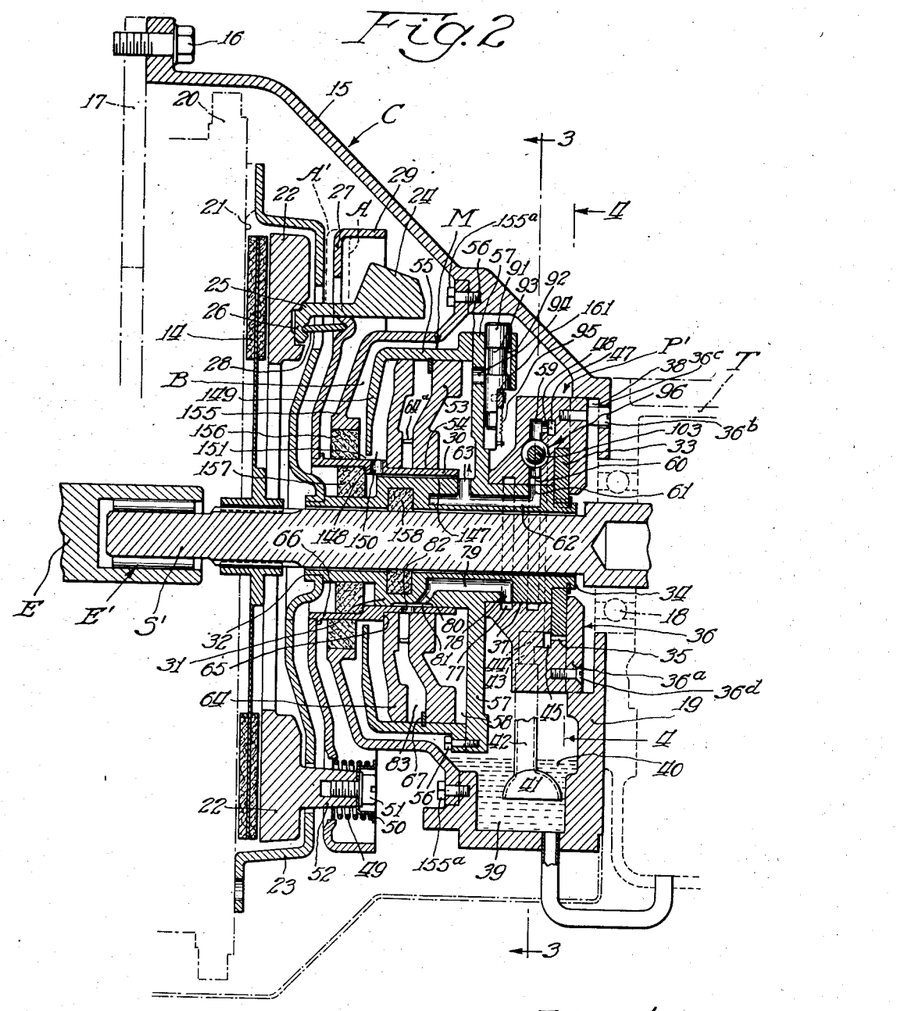
Fig. 2 is a vertical axial sectional view through the clutch system thereof.

Referring now to Fig. 2, the clutch C is encased in a flywheel housing 15, the forward region of which is secured in a conventional manner, as at 16, to the rear end of the engine, a small portion of which is indicated in broken lines at 17. The transmission drive shaft S' may be journalled in a bearing 18 mounted between the rear end wall portion 19 of the flywheel housing 15 and the forward region of the transmission T, and piloted at its forward end, as at E', in the engine shaft E, which in turn is journalled in a well known manner in the engine. The engine flywheel, indicated at 20, is mounted on the engine shaft E, and has a clutch face 21. The clutch driven member 14 is adapted to be frictionally engaged between the face 21 and a pressure plate 22, mounted in a conventional manner for axial movement within a clutch cover plate 23 which is secured in a conventional manner to the flywheel 20.

The pressure plate 22 is adapted to be urged toward the flywheel 20 by a series of centrifugal control elements or weights 24 having heel regions 25 fulcrumed against the plate 22, and toe portions 26 adapted to react against a reaction plate 27 through the medium of links 28. The construction just described may be in general such as that illustrated in application for U. S. Letters Patent, Serial No. 672,820, filed May 23, 1933, now Patent No. 2,164,540, dated July 4, 1939. It may be noted at this point that, assuming the position of the reaction plate 27 to be fixed, rotation of the assembly, including the flywheel 20, pressure plate 22, weights 24 and reaction plate 27, will tend to cause the weights 24 to move radially outwardly under the influence of centrifugal force, whereby the heel regions 25 will press against and tend to move the plate 22 toward the flywheel 20, and at a predetermined speed, the driven member 14 will be engaged between the pressure plate 22 and clutch face 21 so as to transmit driving movement from the flywheel to the transmission drive shaft S'.

Figure 5:
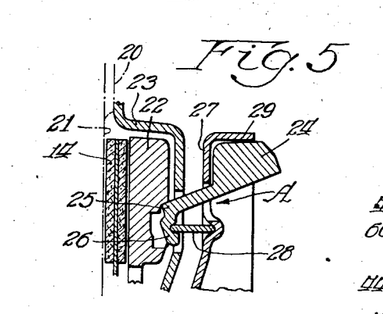
Fig. 5 is a detail sectional view showing the centrifugal control element of the clutch in fully extended positions.

The position of the plate 27, however, is subject to adjustment from a "full release" position of such adjustment illustrated in full lines in Fig. 5, and indicated in dotted lines at A in Fig. 2, wherein the centrifugal elements 24 are adapted to reach their outermost limits of movement, determined by contact with the rim 29 of the reaction plate 27 without engaging the clutch, to an opposite extreme position, as indicated in dotted lines at A', in which the clutch is "locked up" against disengagement irrespective of the speed of rotation.

Intermediate the two positions A and A' just described, is a position, shown in full lines in Fig. 2, which may be designated conveniently as the speed-responsive position, in which the reaction plate 27 is adapted to control the action of the centrifugal elements 24 in such a manner that the clutch will be disengaged below a predetermined engine speed, such, for example, as 800 R. P. M., and will become engaged when the engine exceeds that speed.

Figure 6:
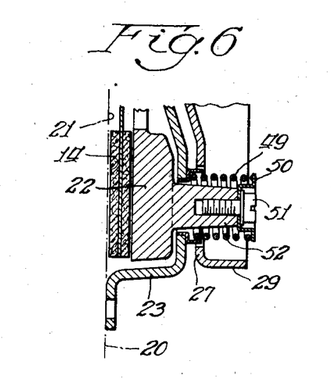
Fig. 6 is a detail sectional view of a portion of the clutch illustrating the retractor spring mechanism.

Movement of the reaction plate 27 to its full release position A is effected by a series of retractor springs 49 (see Fig. 6) compressed between the cover plate 23 and washers 50 secured by screws 51 on the ends of studs 52 projecting from the pressure plate 22.

The reaction plate 27 pilots on a hub 30 which is mounted for axial movement on a sleeve 31 through which the transmission drive shaft S' extends. The sleeve 31 in turn is mounted at 32 in the center of the clutch cover 23 so as to be rotatable in unison with the flywheel 20. The shaft S' extends loosely through the sleeve 31 with sufficient clearance so that the latter may adjust itself to any slight divergence that might exist between the axis of rotation of the cover 23 and that of the shaft S'.

The clutch pump P' (see Figs. 2 and 4), which supplies fluid under pressure for adjusting the clutch to its speed-responsive position, is of a rotary eccentric type comprising a rotor 33 mounted on a reduced end region 34 of the sleeve 31, and rotatable in a chamber 35 formed in a pump casing 36 which is mounted at 37 on the sleeve 31 and has a cover 36a frictionally fitted into a recess 38 formed in the rear end wall 19 of the flywheel housing 15. The fit of the pump cover 36a in the recess 38 is such as to allow the casing 36 to adjust itself to the axis of the sleeve 31, without binding, while the sleeve 31 rotates therein. The pump is piloted by a screw 36b on the pump cover, having a head projecting through a clearance hole 36c in housing 15. The screw 36b carries the torque load between the pump and the housing 15.

Figure 4:
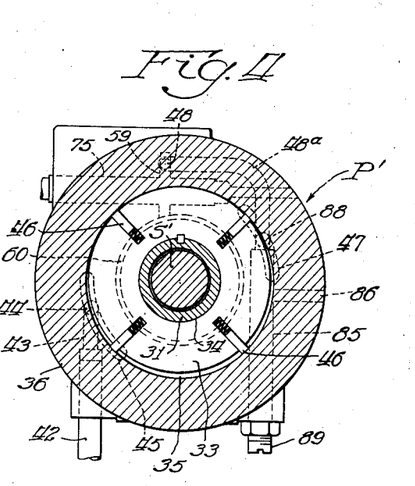
Fig. 4 is a sectional view through the engine driven fluid pump.

The cover 36a may be secured to the casing 36 by means of countersunk screws 36d and the pilot screw 36b.

In the lower region of the housing 15 is formed an oil sump 39 adapted to hold a body of oil 40 from which oil may be drawn through a screened inlet valve 41, an inlet tube 42, a passage 43 extending upwardly in the pump casing 36, and a passage 44 extending rearwardly, into an arc-shaped inlet port 45 in the housing 36, registering with a portion of the periphery of the pump chamber 35, and thence into the chamber 35.

An annular partition wall 155, secured at 155a to the flywheel housing 15, cooperates with the rear region thereof to form a fluid motor compartment B of which the sump 39 forms the bottom. The compartment B may be sealed from the remainder of the interior of the flywheel housing by means of an oil seal, indicated schematically at 156, interposed between the wall 155 and the hub portion 66 of the reaction plate, a seal 157, interposed between the hub portion 66 and the sleeve 31, and a seal 158, interposed between the sleeve 31 and the shaft S'.

The clutch pump rotor 33, which is eccentric with respect to the chamber 35, and which has radially slidable vanes 46, as it rotates, will cause oil to be drawn from the inlet port 45, and to be transferred to an arc-shaped outlet port 47 from which the oil is delivered through a passage 48a extending upwardly and thence laterally to a forwardly extending passage 48 located above the top of the pump chamber.

Adjustment of the reaction plate 27 to the intermediate or speed-responsive position shown in full lines in Fig. 2 is effected by a fluid motor M acting against an annular piston 53 axially slidable at 54 on the hub 30 of the reaction plate 27. The periphery of the piston 53 is fitted within a cylinder 55 which is secured at 56 to a circular flange 57 formed on the sleeve 31. Fluid is delivered from the clutch pump P' to a chamber 58 between the piston 53 and the flange 57, through the pump outlet port 47, to the passages 48a and 48, a radial passage 59 in the pump housing 36, an annular passage 60 formed in the pump housing 36, a radial passage 61 in the sleeve 31, communicating with the annular passage 60, an axial passage 62 in the sleeve 31, and a radial passage 63 in the sleeve 31 communicating with the chamber 58.

Forward movement of the piston 53, caused by fluid pressure in the chamber 58 is transmitted first to a secondary piston 64 through the medium of lugs 64a formed on either of the pistons 53, 64, and thence to a shoulder 65 formed between the hub 30 of the reaction plate 27 and an enlarged region 66 of said hub.

Forward movement of the piston 53 under fluid pressure delivered from the clutch pump, is limited by a stop ring 67 in the cylinder 55, against which the periphery of the piston 53 will engage, so as to position the reaction plate 27 in its speed-responsive position.

It may now be noted that when the engine is started, oil will be delivered by the clutch pump to the chamber 58 so as to advance the piston 53 and adjust the clutch from full release to speed-responsive position, whereupon the clutch will react to engine speed to provide a driving engagement between the engine shaft E and the transmission drive shaft S' as soon as the engine speed has reached a high enough level.

During this stage of operation of the vehicle, the transmission pump P will have no effect upon the clutch C. When the transmission is shifted from starting range to driving range, however, the valve V will route oil from the pump P through a tube 68. The valve V may comprise a piston type valve, including a housing 175 having a bore 176 in which the valve plunger 177 is slidable. Suitable ports, not shown, may be provided in the lower region of the housing 175 and arranged to communicate with the mechanism in the transmission T which controls the shifting thereof. The plunger 177 is shown in an intermediate position corresponding to first gear ratio of the transmission as determined by the lever L in its position shown in Fig. 1. When in this position, or the neutral or reverse positions indicated at N and R respectively in Fig. 1, the plunger 177 closes a port 178 leading to the tube 68. When moved to either second gear or direct drive positions, corresponding to the positions numbered 2 and 3 in Fig. 1, the plunger 177 will establish communication between the tube 68 and the bore 176, through a suitable port such as the elongated port 179 in its side wall. Thus, communication will be established between the tube 68 and the tube 13 communicating with the bore 176. The oil thus delivered to the tube 68 from the pump P will travel to a passage 69 in a cap 70 secured in an opening 71 in the clutch housing 15 (see Fig. 3), thence through a telescoping flexible union 72 extending between the cap 70 and a boss 73 on the pump housing 36, thence through a passage 74 in the housing 36, into a manual valve chamber 75, thence through a passage 76 in the housing 36, thence into an annular passage 77 in the housing 36, disposed forwardly of the annular passage 60 (see Fig. 2), thence through a radial passage 78 in the sleeve 31, communicating with the annular passage 77, thence through an axial passage 79 and a substantially radial passage 80 in the sleeve 31 into an annular passage 81 in the sleeve 31, and thence through a radial passage 82 in the hub 30 of the reaction plate 27 communicating with the passage 81, into a chamber 83 formed between the pistons 53 and 64. The fluid thus delivered under pressure between the pistons 53 and 64 will cause the piston 64 to advance, transmitting movement through the shoulders 65 and the hub portion 66 to the reaction plate 27 so as to advance the same to the "lock-up" position A'. In doing so, the fluid will react against the piston 53 which, being still subject to the fluid pressure developed by the clutch pump P', will remain in its advanced position against the stop ring 67, since the pressure developed by the transmission pump P is somewhat less than that developed by the clutch pump P'.

It will now be apparent that when the transmission is adjusted to the driving range, the transmission pump P will become operative to advance the clutch to its final stage of engagement, i. e., "lock-up" position, so that there will be no possible slippage of the clutch as long as the car is being operated in the driving range.

When the pressure developed by the clutch pump P' has arrived at a maximum, further pressure will be relieved by a pressure relief valve 84 (see Fig. 3) slidably mounted in a valve chamber 85 in the housing 36, adapted to vent through a discharge port 86 communicating with the side of the chamber 85, the excess oil that may flow to the upper end of the chamber 85 through a passage 87 connected by means of a horizontal passage 88 to the discharge port 47 of the pump P' (see Fig. 4). The valve 84 is adapted to open against the pressure of a spring 90 engaged between an adjusting screw 89 and the lower end of the valve. Its resistance to opening may be varied by means of the adjusting screw 89 which is threaded into the chamber 85.

Having established the "lock-up" clutch engagement, the car may be driven at any normal speed, and should this speed become excessive, the resulting strain upon the centrifugal operating mechanism of the clutch may be limited by the engagement of the centrifugal elements 24 against the rim 29 of the reaction plate 27. Such engagement is possible for the reason that after the pressure plate 22 has reached its limit of forward movement (at which limit the weights 24 will not initially engage the rim 29), the elements 24 may continue to move outwardly, such additional outward movement being compensated for by recession of the reaction plate 27 against the fluid pressure in the chamber 33. As a result of this arrangement, it is possible to initially adjust the clutch so that the weights 24 may engage the rim 29 at any stage in the wearing down of the facings of the driven element 14, without destroying the secure engagement of the clutch.

The clutch, having been locked up for normal driving operations, must be allowed to disengage when a stop is made, in order to prevent stalling the engine. As heretofore stated, the transmission control mechanism cannot be fully relied upon to effect release of the main clutch, because of the time interval required for effecting the change from driving range to starting range. If the clutch could be made to react instantly to an adjustment of the control lever L from driving range to starting range, so as to be released from lock-up position back to speed-responsive position, satisfactory clutch release could be had automatically as a function of the transmission control mechanism. But on rapid stops we find, however, that the time required for a reduction in car speed to effect shift of the transmission to starting range so as to cut off the delivery of fluid from the transmission pump P to the clutch C, is sufficient so that the vehicle may approach closely to or arrive at a stop before the clutch has been fully disengaged.

To meet this problem, we have provided a centrifugal dump valve 91, slidable in a radial valve chamber 92 in the flange 57, and having a reduced neck portion 93 forming in the chamber 92 an annular space which is adapted, when the speed of rotation of the flywheel assembly is below a predetermined limit, such as 500 R. P. M., and the valve is, as a result, at its inner limit of radial movement, to establish communication through a port 94 in the wall of the valve chamber 92, between the piston chamber 58 and the inner end opening of the valve chamber 92 so as to allow oil to escape from the chamber 58 into the fluid motor compartment B and to drain into the sump 39. Tension springs 95, one end of each of which is attached to a cross bar 161 on the valve 91, and the other ends of which are attached to the flange 57, urge the valve radially inwardly toward its inner limit of radial movement. The construction in this respect may be similar to that shown in Fig. 10.

When the engine is travelling at speeds greater than the aforesaid speed limit, the valve 91 will occupy a position at its outer limit of radial movement, as shown in Fig. 2, closing the port 94. This position may be determined by the cross bar 161 which may engage against the inner extremity of the valve chamber 92. The opening of the valve 91 will effect quick release of the pressure within the chamber 58 so as to allow the pistons 53 and 64 both to recede sufficiently to return the clutch to speed-responsive position. The supply of fluid under pressure from the transmission pump P will be cut off before pressure has been built up sufficiently in the chamber 83 to offset the release of oil from the chamber 58.

For push starting of the vehicle, fluid is delivered from the transmission pump through the passages 69, 74, 76, 77, 78, 79, 80, 81 and 82, into the piston chamber 83 between the pistons 53 and 64, and, after the piston 53 has been moved to its rearward limit of movement, if it is not already in that position, the piston 64 is advanced until the clutch becomes locked up. A prerequisite to this action is that the transmission be adjusted to driving range so that the transmission pump may become operative to deliver fluid to the clutch C. As soon as the clutch becomes engaged, the engine will commence to turn over, and when the engine starts, the vehicle will proceed in the driving range.

We have found that under excessive speed conditions, enough centrifugal force may be developed in the bodies of oil in the chambers 58 and 83 to maintain the clutch in locked-up condition irrespective of the pressure delivered by the pumps. In order to prevent excess pressure being thus developed in the piston chambers, we provide a bleed-off vent 147 between the sleeve 31 and the hub 30, leading through an opening 150 in the hub 30 into a balancing chamber 148 formed between the forward side of the piston 64 and a hood 149 extending inwardly from the forward region of the cylinder 55. The hood 149 has a central opening 151 loosely receiving the hub portion 66 of the reaction plate 27 and allowing escape of excess oil into the fluid motor compartment B. Oil entering the balancing chamber 148 under excessive speed conditions, will fill the same and remain therein by centrifugal action, exerting a rearward pressure against the piston 64 to balance the forward pressure thereagainst caused by centrifugal action in the chamber 83.

Figure 3:
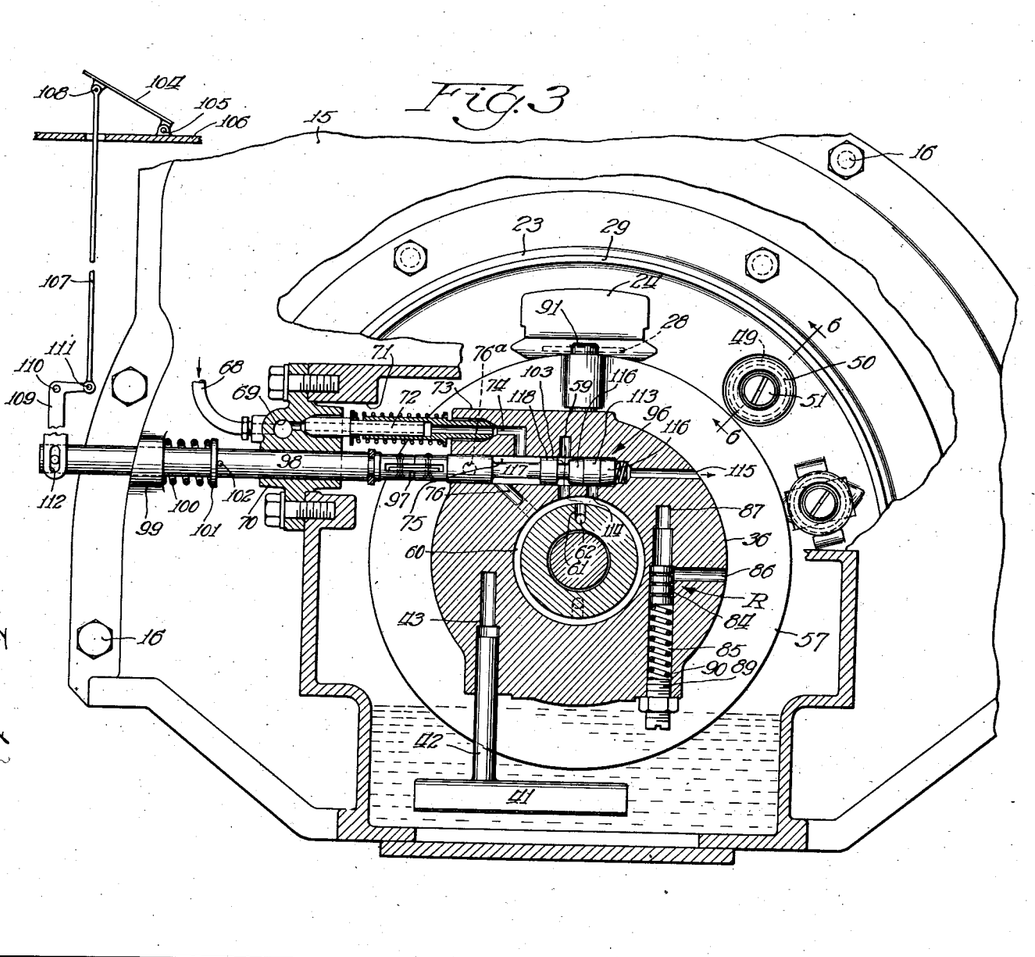
Fig. 3 is a vertical transverse sectional view thereof, taken as indicated by the line 3—3 of Fig. 2.

For manual operation of the clutch, we provide a manual control valve 96 slidably mounted in the manual valve chamber 75 (see Fig. 3). The valve 96 is connected by a flexible joint 97 to a valve rod 98 slidably mounted in the cap 70 and in a bearing 99 formed on the flywheel housing 15. A compression spring 100, interposed between the end of the bearing 99 and a washer 101 pinned at 102 on the valve rod 98, normally urges the valve to the right, as viewed in Fig. 3, to the position shown in full lines in that figure. In this position of the valves, normal communication is established by way of an annular space formed by a reduced neck region 103 in the valve 96, between the two sections of the vertical passage 59 which are separated by the valve chamber 75, so that oil may flow from the discharge port 47 of the clutch pump P' into the annular passage 60, and thence through the passages 61, 62 and 63 into the piston chamber 58.

The valve 96 may be moved to the left (as viewed in Fig. 3) through the medium of a foot pedal 104 pivoted at 105 to the floor 106 of the vehicle, a push rod 107 pivoted at 108 to the pedal 104, and a bell crank lever 109 pivoted at 110 to a fixed part of the vehicle, pivoted at 111 to the push rod 107 and having a pin and slot connection 112 with the end of the valve rod 98. At the limit of its movement to the left, the head 113 of the valve will close the passage 59 so as to cut off the delivery of fluid to the chamber 58 and cause the output of the pump to be by-passed through the discharge port 86 of the relief valve. At the same time, oil will be allowed to escape from the chamber 58 through the passages 63, 62, 61 and 60 to a passage 114, thence through the end region of the valve chamber 75 beyond the end of the head 113, and out through a discharge port 115 communicating with the end of the chamber 75.

A gradual closing off of the passage 59 and opening up of the passage 114, and vice versa, may be attained as a result of the tapered regions 116 of the head 113. This enables the operator to obtain a pedal-controlled partial engagement or slippage of the clutch at will.

When the valve 96 is in the position shown in Fig. 3, it establishes communication between the passages 74 and 76 of the transmission pump line through an annular space formed in the chamber 75 by a reduced waist portion 117 formed in the valve. When the valve is at its outer limit of movement, the collar portion 118 formed between the waist region 117 and neck portion 103, will close off the passage 74 so as to cut off the delivery of fluid from the transmission pump and the chamber 83 will be vented through a port 76a in the skirt portion 96a of the valve 96. Release of oil from the chamber 58 will allow the clutch to become disengaged. It will be understood that the transmission pump incorporates a relief valve or other means for relieving excess pressure developed therein, so that the cutting off of flow to the clutch C will not result in any increase in pressure in the transmission pump line beyond the normal pressure delivered by the transmission pump.

In the form of the invention shown in Figs. 7, 8, 9 and 10, the general combination of a centrifugal clutch with hydraulic operating mechanism including an engine driven pump for adjusting the clutch to its speed-responsive position, and a transmission driven pump for adjusting the clutch to its lock-up position, is embodied, and the same reference characters are employed to designate those parts which are the same as in the form of the invention hereinbefore described.

Figures 7, 8, 11:
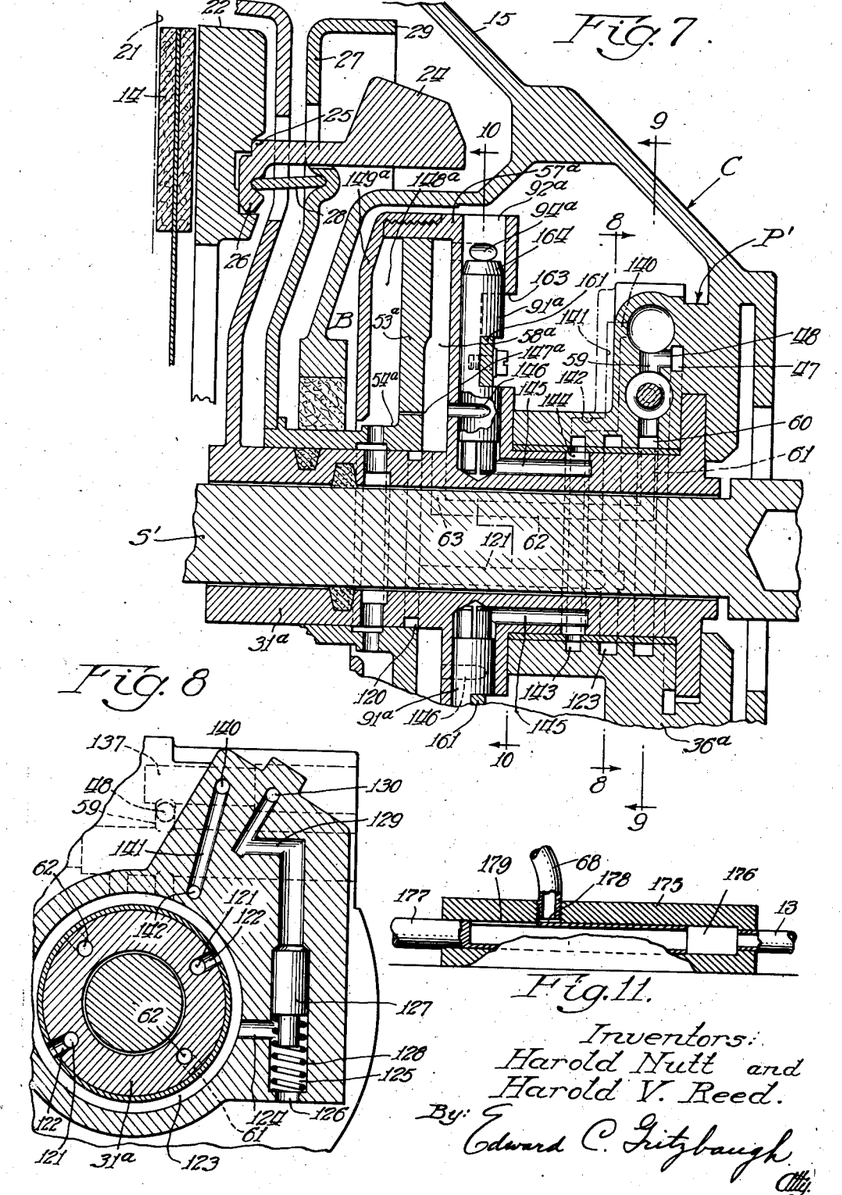
Fig. 7 is a sectional view similar to Fig. 2 illustrating a somewhat modified form of the invention.
Fig. 8 is a detail sectional view taken as indicated by the line 8—8 of Fig. 7.
Fig. 11 is a detailed sectional view of a portion of the shift valve.

Instead of employing two pistons, however, this form of the invention embodies a single piston, designated 53a in Fig. 7, which has two stages of movement corresponding to the two positions to which it is adapted to move the reaction plate 27. The piston 53a may be formed as an integral part of or attached to the hub 54a of the reaction plate 27.

Movement of the piston 53a from its initial at-rest position to its intermediate position determining the speed-responsive position of the clutch, is effected by fluid under pressure delivered from the clutch pump through the pump discharge port 47, the passages 48a and 48, the passage 59, the annular passage 60 and the radial passage 61, axial passage 62 and radial passage 63, formed in the sleeve 31a, indicated in dotted lines in Fig. 7, into the piston chamber 58a. When the piston 53a reaches this intermediate position shown in Fig. 7, it uncovers an annular bleed-off port 120 formed in the sleeve 31a, allowing oil to escape therethrough into an axial passage 121 in the sleeve 31a (shown in dotted lines in Fig. 7), thence through a radial passage 122 in the sleeve 31a (see Fig. 8) into an annular passage 123 in the clutch pump casing 36a with which the radial passage 122 communicates, and thence through a radial vent 124 into a cut-off valve chamber 125, and thence through the vent opening 126 establishing communication between the end of the chamber 125 and the fluid motor compartment B, so that the oil may be discharged into the sump 39.

Lock-up of the clutch is accomplished by closing the vent 124 so as to cut off the escape of oil through the route just described. This closing of the vent 124 is effected by means of a cut-off valve 127 slidably mounted in the cut-off valve chamber 125. A compression spring 128, engaged between the end of the chamber 125 and the valve 127, normally holds the valve in its open position, as shown in Fig. 8. Movement of the valve to closed position, obstructing the vent 124, is effected by the delivery of oil under pressure into the chamber 125 through a passage 129 in the pump housing 36, such oil being supplied from the transmission pump line, and reaching the passage 129 through a short axial passage 130 communicating (see Fig. 9) with an annular passage 131 formed between a fitting member 132 with which the flexible union 72 communicates, and a chamber 133 in the pump housing 36, in which the fitting member 132 is received. An opening 134 in the fitting member 132 provides communication between a passage 135 extending axially through the fitting 132, and the annular passage 131.

A relay valve 136, slidably mounted in a relay valve chamber 137 forming a continuation of the chamber 133, normally seats against the end of the fitting member 132 which forms a valve seat, so as to close the end of the passage 135 and cause the fluid from the transmission pump to be directed to the cut-off valve 127. Fluid under pressure from the clutch pump is delivered to the opposite end of the relay valve 136 through the upper end of the passage 59a which communicates with the relay valve chamber 137. Since the pressure delivered by the clutch pump is greater than that delivered by the transmission pump, sufficiently to maintain a pressure differential of, for example, ten pounds, the relay valve 136 will normally be maintained in the position shown in Fig. 9, closing the passage 135, and forcing the transmission pump to dispose of its excess oil through its relief outlet after the cut-off valve 127 has been closed. The relay valve 136 has a reduced nose portion 138 adapted to engage the end of the valve chamber 137 so as to assure access of fluid from the passage 59 into the chamber 137 at all times.

Figures 9, 10:
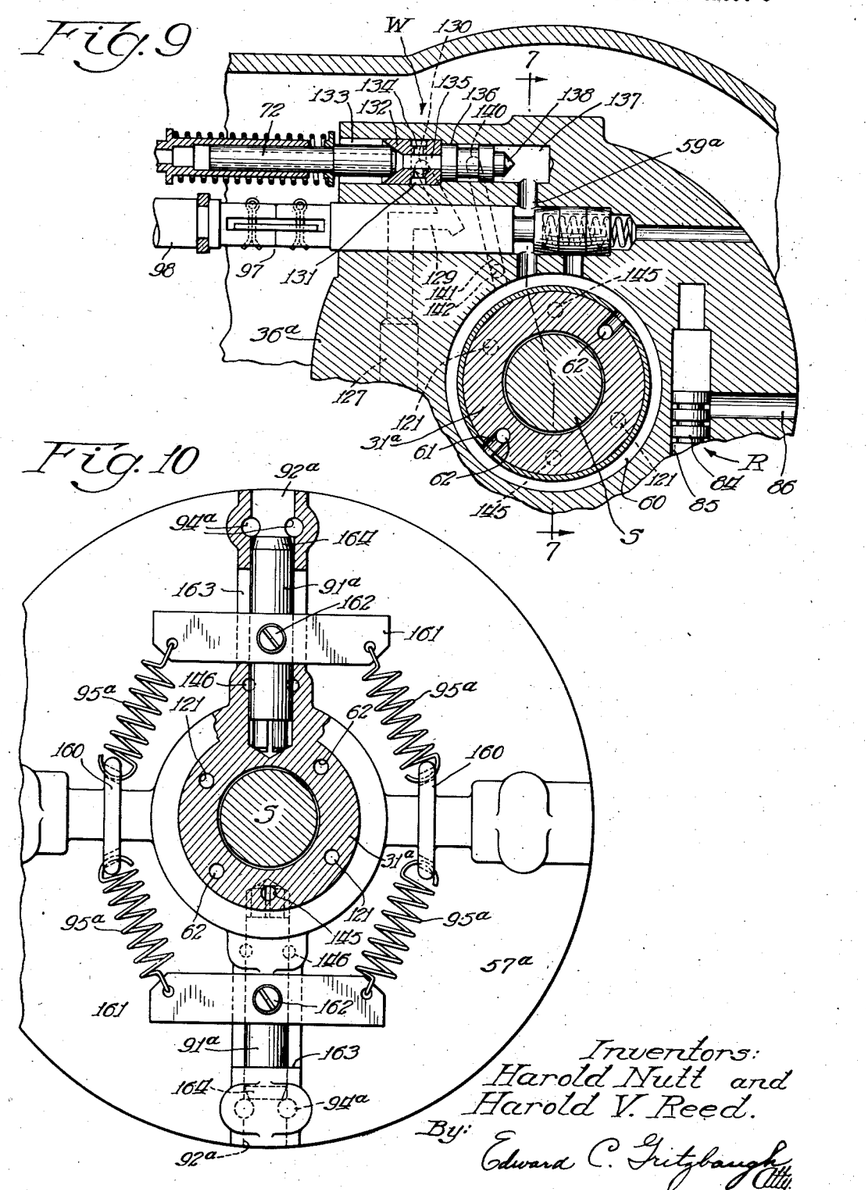
Fig. 9 is a detail sectional view taken as indicated by the line 9—9 of Fig. 7.
Fig. 10 is a detail sectional view taken as indicated by the line 10—10 of Fig. 7.

For push starting of the vehicle, the relay valve 136 is adapted to move to the right, as viewed in Fig. 9, under pressure of the fluid delivered from the transmission pump until a port 140, indicated in dotted lines in Fig. 9, is uncovered. A passage 141 leads downwardly from the port 140 and communicates at its lower end with an axial passage 142 (see Fig. 7) which in turn communicates with an annular passage 143 in the pump housing 36. The annular passage 143 communicates through radial passages 144 in the sleeve 31a with a pair of axial passages 145 in the sleeve 31a leading to the inner ends of dump valve chambers 92a.

The dump valves 91a, which are slidably mounted in the valve chambers 92a, are adapted to be moved radially outwardly by the fluid pressure thus exerted at their inner ends, until they uncover ports 146 leading through the wall of the chamber 92a into the piston chamber 58a. Fluid from the transmission pump is thus directed into the piston chamber 58a and reacts against the piston 53a to move the clutch into lock-up position, the cut-off valve 127 being held in closed position by pressure from the transmission pump line. Load of spring 128 must be low enough so that the oil pressure developed in overcoming the load of dump valve spring 95a, and the pressure plate retractor spring 49 will close the valve 127.

It is possible for the transmission pump to move the relay valve 136 so as to uncover the port 140 during a push start, for the reason that the engine will not be running, and consequently the clutch pump P' will be inoperative.

When the vehicle is being operated in the starting range, the cut-off valve 127 will be allowed to move under the pressure of the spring 128 to its open position, uncovering the vent 124, since the transmission pump will not be delivering fluid to the main clutch C through the tube 68 at that time.

Venting of excess pressure in the piston chamber 58a developed by centrifugal action under excessive speed conditions is accomplished by a vent 147a extending through the piston 53a into the balancing chamber 148a defined between the piston 53a and the hood 149a.

The dump valves 91a are adapted to be moved radially inwardly by coil springs 95a (see Fig. 10) attached at one end to an ear 160 formed on the flange 57a, and at its other end to a cross head 161 attached at 162 to a respective valve 91a, and slidable in notches 163 in the walls of the dump valve chambers 92a. The cross heads 161, by engagement with the ends of the notches 163, determine the limits of movement of the valves 91a.

In this form of the invention, the outer ends of the dump valve pistons 91a are beveled, as at 164, so as to provide a gradual closing and unclosing of the dump ports 94a.

Instead of establishing communication between the ports 94a and inner end regions of the chambers 92a, as in the previously described form of the invention, the dump valves 91a, when in their retracted positions, are adapted to open the ports 94a to communication with the outer end openings of the chambers 92a so that the discharge of fluid from the piston chamber 58a is assisted by the action of the centrifugal forces developed in the fluid itself. This gives a more rapid clearing action which is highly desirable.

The invention provides means for automatically causing the clutch to advance from full release position to speed-responsive position as soon as the engine is started, such means being in the form of a fluid pump driven by the engine and thus operative as soon as the engine starts, and means for automatically causing the clutch to advance from speed-responsive position to lock-up position as soon as the transmission is adjusted to driving range, such means being in the form of a fluid pump driven and controlled by the transmission. The transmission pump is operative independently of the engine driven pump, for engaging the clutch for push starting, when the engine driven pump is inoperative. Means are provided for quickly releasing the clutch on a quick stop, such means being in the form of a centrifugal dump valve or valves, responsive directly to engine speed, for releasing fluid from the fluid motor which directly controls the clutch operating mechanism. Manual control is also provided, in the form of a manual valve for releasing fluid from the motor and simultaneously cutting off the supply of fluid to the motor.

We claim:

1. In a clutch system for a motor vehicle having driving and driven mechanisms, a clutch for operatively connecting said driving and driven mechanisms, including centrifugal weight mechanism for automatic operation of the clutch, said weight mechanism being adjustable to either a position in which it is speed-responsive or a lock-up position in which it maintains the clutch in engaged condition irrespective of speed, and control mechanism including a fluid pump driven by said driving mechanism, adapted to cause said operating mechanism to assume speed-responsive position, and a fluid pump driven by said driven mechanism, adapted to cause said operating mechanism to assume lockup position.

2. In a clutch system for a motor vehicle having driving and driven mechanisms, and including a change-speed transmission having a driving range and a starting range, a clutch for operatively connecting said driving and driven mechanisms, including centrifugal weight mechanism for automatic operation of the clutch, said clutch being adjustable either to a position in which said centrifugal mechanism is operative to effect engagement and disengagment of the clutch in response to changes in rotational speed or a lockup position in which it remains in engaged condition irrespective of speed, and control mechanism including a fluid pump driven by said driving mechanism, adapted to cause said clutch to assume speed-responsive position when the transmission is adjusted to the starting range, and means for causing said clutch to assume lockup position when the transmission is adjusted to the driving range.

3. In a clutch system for a motor vehicle having driving mechanism and driven mechanism including a change speed transmission having a driving range and a starting range; a clutch for operatively connecting said driving and driven mechanisms, said clutch being adjustable to either a position in which it is speed-responsive or a lockup position in which it remains in engaged condition irrespective of speed, and control mechanism including a fluid pump driven by said driving mechanism adapted to cause said clutch to assume speed-responsive position during initial operation of the driving mechanism, and a fluid pump driven by said driven mechanism, adapted to cause said clutch to assume lockup position when said transmission is adjusted to driving range, said pumps performing their stated functions without commingling of their respective fluid streams.

4. In a clutch system for a motor vehicle having driving and driven mechanisms, a clutch, speed-responsive mechanism, and control means including a fluid motor having an initial stage of movement in which it renders said speed-responsive mechanism operative to exercise a controlling effect upon said clutch, and a secondary stage in which it causes said clutch to become locked in engagement irrespective of speed, a fluid pump driven by said driving mechanism, adapted to cause said fluid motor to undergo said initial stage of movement, and a fluid pump driven by said driven mechanism for causing said fluid motor to undergo said second stage of movement.

5. A clutch system as defined in claim 4, wherein said fluid motor has two pistons, and wherein said initial stage of movement is effected by advancing movement of one of said pistons under pressure of fluid introduced behind it, and said secondary stage is effected by movement of the other of said pistons under pressure of fluid introduced between said pistons.

6. In a clutch system, a clutch for operatively connecting driving and driven mechanisms, speed-responsive means, and control means including a fluid motor having two pistons, a pump driven by said driving mechanism for supplying fluid under pressure to said motor behind one of said pistons for causing said piston to advance so as to engage the other piston whereby to render said speed-responsive means operative to effect disengagement of the clutch at a reduced speed, and a fluid pump driven by said driven mechanism for supplying fluid under pressure between said pistons for causing said other piston to advance, whereby to cause said clutch to become locked in engagement irrespective of speed.

7. In a clutch system for a motor vehicle including a change speed transmission having a starting range and a driving range; a clutch, speed-responsive mechanism, and control means including a fluid motor having a rear and a forward piston, means operative when said transmission is adjusted to starting range, for delivering fluid under pressure to said motor behind said rear piston for advancing said piston into engagement with said forward piston and moving the latter through an initial stage of movement, whereby to render said speed-responsive mechanism operative to exercise a controlling effect upon the clutch, means for limiting the movement of said rear piston to define the limit of said initial stage of movement, and means, operative when the transmission is adjusted to driving range, for causing said forward piston to advance through a secondary stage of movement so as to cause said clutch to remain locked in engagement irrespective of speed.

8. A clutch system as defined in claim 4, wherein said fluid motor has a single piston and a bleed opening which is uncovered by said piston at the end of said first stage of movement so as to allow subsequently introduced fluid to escape from said motor and thereby interrupt the advance of said piston, and wherein said second mentioned pump is adapted to effect cutting off of the escape of fluid through said bleed opening so as to cause said piston to further advance to complete the said secondary stage of movement of the fluid motor.

9. In a clutch system for a motor vehicle having driving and driven mechanism, a clutch for operatively connecting said mechanisms, speed-responsive means, and control means including a fluid pump driven by said driving mechanism and adapted to render said speed-responsive means operative to effect disengagement of said clutch at a reduced speed, a second fluid pump, driven by said driven mechanism, and a valve, normally held by fluid pressure from said first mentioned pump, in a position wherein it is effective to render said second mentioned pump operative to modify the action of said first mentioned pump so as to cause said clutch to become locked in engagement irrespective of speed, and, when said first mentioned pump is not operating, to move to another position and to thereby render the second mentioned pump operative to cause said clutch to engage for push starting of the vehicle.

10. In a clutch system for motor vehicles, a clutch, a fluid motor for operating the clutch, and a dump valve operatively associated with said motor, said valve including a radially disposed valve chamber mounted for rotation along with a moving part of the vehicle, and a valve element in said chamber, adapted to move to closed position by centrifugal action and to open when rotational speed of said chamber drops below a predetermined level, so as to allow escape of fluid from said fluid motor and to thereby cause said clutch to become disengaged.

11. In a clutch system for a motor vehicle, a clutch, a fluid motor including a cylinder, coaxial with and rotatable in unison with one member of said clutch, a piston in said cylinder operatively connected with said clutch for operating the same, a valve chamber fixedly associated with said cylinder, its longitudinal axis radial with respect thereto, and a valve in said valve chamber, adapted to close by centrifugal action and to open when rotational speed of said cylinder drops below a predetermined level, so as to allow escape of fluid from said cylinder, whereby said piston may recede and thereby cause said clutch to become disengaged.

12. In a clutch system for motor vehicles, a clutch, a fluid motor for operating the clutch, and a dump valve operatively associated with said motor, said valve including a valve chamber mounted for rotation along with a moving part of the vehicle, its longitudinal axis radial with respect to the axis of rotation, and a valve element in said chamber, adapted to move to closed position by centrifugal action and to open when rotational speed of said chamber drops below a predetermined level, so as to allow escape of fluid from said fluid motor in a radially outward direction, assisted by centrifugal force developed in the fluid thus escaping, and to thereby cause said clutch to become disengaged.

13. In a clutch system for motor vehicles, a clutch, a fluid motor for operating the clutch, a dump valve operatively associated with said motor, said valve including a valve chamber mounted for rotation along with a moving part of the vehicle, a valve element in said chamber, adapted to move to closed position by centrifugal action and to open when rotational speed of said chamber drops below a predetermined level, so as to allow escape of fluid from said fluid motor and to thereby cause said clutch to become disengaged, speed-responsive mechanism, a fluid pump adapted to supply fluid under pressure to the fluid motor so as to render said speed-responsive mechanism operative to exercise a controlling effect upon the clutch, a second fluid pump, operative to modify the action of the fluid motor so that the fluid delivered by said first mentioned pump may operate said motor to cause said clutch to remain locked in engagement irrespective of speed, and fluid connections whereby said second mentioned pump is adapted when said first mentioned pump is not operating to itself operate the fluid motor so as to cause the clutch to engage for push starting of the vehicle, said connections including a port normally closed by said dump valve when the latter is in its aforesaid open position, and a passage for leading fluid to the inner end of said valve so as to exert pressure thereagainst and cause the same to move radially outwardly to establish communication between said passage and said port for delivering fluid into the motor.

14. A clutch system as defined in claim 13, including a valve adapted, when both pumps are operating, to route the fluid from said second mentioned pump so as to cause the aforesaid modifying action and to cut off communication to said passage, and, when the first mentioned pump is not operating, to route the fluid therefrom to said passage.

15. In a clutch system for a motor vehicle having driving mechanism and driven mechanism including a change-speed transmission having a driving range and a starting range; a clutch for operatively connecting said driving and driven mechanisms, said clutch being adjustable to either a position in which it is speed-responsive, or a lockup position in which it remains in engaged condition irrespective of speed, a fluid pump driven by the driving mechanism, a fluid pump driven by the driven mechanism, means controlled by said first mentioned pump for causing said clutch to assume speed-responsive position during the initial operation of the driving mechanism, and means controlled by said second mentioned pump for causing said clutch to assume lockup position when said transmission is adjusted to the driving range.

16. In a power transmission system for a motor vehicle having driving and driven members, clutch means for establishing a drive connection between said members, means forming a chamber rotatable in timed relationship to the rotation of one of said members, a centrifugal force responsive clutch control element movable, in said chamber, to and from a position wherein it contributes to clutch engagement from and to a position wherein it causes the clutch to become disengaged, and means for delivering fluid under pressure into said chamber for action against said element to maintain said element in its clutch engaging position irrespective of the centrifugal action thereof.

17. In a power transmission system for a motor vehicle having driving and driven members, clutch means for establishing a drive connection between said members, means forming a chamber rotatable in timed relationship to the rotation of one of said members, a centrifugal force responsive control element in said chamber, resilient means yieldingly opposing the action of centrifugal force on said element, said element being movable, under the action of centrifugal force and said resilient means, to and from a position wherein it contributes to clutch engagement from and to a position wherein it causes the clutch to be disengaged, and means for delivering fluid under pressure into said chamber for action against said element to maintain said element in its clutch engaging position irrespective of variations in said centrifugal force.

18. In a power transmission system for a motor vehicle having driving and driven mechanisms, a clutch including driving and driven members connected to said driving and driven mechanisms respectively, means connected to said driving member for rotation therewith, said means forming a chamber, a clutch control element movable in said chamber under the action of centrifugal force toward a position wherein it contributes to clutch engagement, resilient means yieldably urging said element in opposition to centrifugal force toward a position wherein it causes the clutch to be disengaged, and means for delivering fluid under pressure into said chamber for action against said element to maintain the latter in its clutch engaging position irrespective of variations in said centrifugal force.

19. In a power transmission system for a motor vehicle having driving and driven members, clutch mechanism for establishing a drive connection between said members, said mechanism including means forming a chamber rotatable in timed relationship with the rotation of one of said members, a centrifugal force responsive clutch control element radially movable in said chamber to and from a position wherein it contributes to clutch engagement from and to a position wherein it causes the clutch to be disengaged, and means for delivering fluid under pressure into said chamber for action against the inner end of said control element so as to supplement centrifugal force in moving said element toward clutch engaging position.

20. In a power transmission system for a motor vehicle having driving and driven members, a clutch for establishing a torque transmitting connection between said members, a fluid motor for operating said clutch, means for delivering fluid under pressure to said motor, means providing a valve chamber rotatable in timed relationship to the rotation of one of said members, a centrifugal force responsive valve element in said chamber adapted, at a predetermined speed of rotation of said chamber, to move under centrifugal force to a closed position wherein it permits the fluid pressure to build up in said motor for effecting clutch engagement, and resilient means yieldingly urging said valve element, in opposition to centrifugal force, toward an open position and adapted to cause said valve element to assume said open position when rotational speed of said chamber drops below a predetermined level, so as to permit escape of said fluid, to thereby effect a reduction in the fluid pressure in said motor and to consequently cause said clutch to become disengaged.

21. In a power transmission system for a motor vehicle having driving and driven members, a clutch for establishing a driving connection between said members, a fluid motor for operating said clutch, means for delivering fluid under pressure to said motor, means providing a valve chamber rotatable in timed relationship to the rotation of one of said members, a centrifugal force responsive valve element in said chamber, resilient means yieldingly opposing the action of centrifugal force on said element, said element being adapted, under the differential action of said centrifugal force and said resilient means to move to and from a closed position wherein it permits the fluid pressure to build up in said fluid motor so as to effect clutch engagement, from and to an open position wherein it permits fluid to escape so as to relieve the pressure in said motor and thereby permit the clutch to become disengaged.

22. A power transmission system as defined in the preceding claim, wherein the movement of said valve element is directly proportional to the speed of rotation of said valve chamber.

23. In a power transmission system for a motor vehicle having driving and driven members, a clutch for establishing a drive connection between said members, speed responsive means, a fluid motor having two pistons, means for directing fluid under pressure to said motor behind one of said pistons for causing said one piston to advance and to engage the other piston and to move the latter to an initial position wherein it renders the speed responsive means operative to exercise a controlling effect upon the clutch, and means for directing fluid under pressure between said pistons for causing said other piston to further advance to a position wherein it causes the clutch to become locked in engagement irrespective of speed.

24. In a power transmission system for a motor vehicle having driving and driven members, a clutch for establishing a drive connection between said members, speed responsive means, a fluid motor operatively associated with said clutch, said fluid motor having a piston adapted at the end of one stage of movement to render said clutch subject to control by said speed responsive mechanism, and at the end of a subsequent stage of movement to cause the clutch means to become locked in engagement irrespective of speed, said fluid motor having a bleed opening which is uncovered by said piston at the end of said first stage of movement so as to interrupt the advance of said piston, and a valve for cutting off the escape of fluid through said bleed opening so as to permit said piston to further advance to complete said subsequent stage of movement.

25. A power transmission system as defined in the preceding claim, wherein said valve is fluid operated, said system including means for directing fluid under pressure against said valve for operating the same.

26. A transmission system as defined in the second preceding claim, including a change-speed transmission having a starting and a driving range, and means for moving said valve to position closing said bleed opening when the transmission is adjusted to the driving range.

27. In a power transmission system for a motor vehicle having a torque transmitting member, mechanism for establishing a driving connection with said member, and a fluid motor for actuating said mechanism, said fluid motor including a casing rotatable with said member, a fluid operated element in said casing, said casing providing on one side of said element a pressure chamber for confining fluid acting against said element, and providing on the other side of said element an annular balancing chamber, said element being provided with a bleed opening for conveying fluid from said pressure chamber to said balancing chamber, the fluid thus conveyed to the balancing chamber being adapted to develop in said balancing chamber, centrifugal forces to counteract the effect of centrifugal forces developed in the fluid in said pressure chamber.

28. In a power transmission system for a motor vehicle having a torque transmitting member, mechanism for establishing a driving connection with said member, and a fluid motor for actuating said mechanism, said fluid motor including a cylinder rotatable with said member, a piston axially slidable in said cylinder, means forming together with said cylinder on one side of said piston, a pressure chamber for confining fluid acting against said piston, and a hood extending radially inwardly from the cylinder on the other side of the piston and spaced therefrom to define a balancing chamber adapted to receive fluid escaping from said pressure chamber past said piston and to confine such fluid for the development therein of centrifugal forces to balance the centrifugal forces developed in the fluid within said pressure chamber, the inner region of said balancing chamber being open to permit the escape of excess fluid therefrom.

29. In a power transmission system for a motor vehicle having driving and driven members, a housing into which at least one of said members extend, means in said housing for establishing a driving connection between said members, fluid operated means in said housing for actuating said first mentioned means, and a pump for supplying fluid under pressure to said fluid operated means, said pump including a casing surrounding one of said members, a pump rotor in said casing, driven by said first mentioned member, and a driving connection between said casing and said housing, the latter having a recess in which said casing is received and piloted and being adapted to adjust itself to variations of positioning of said last mentioned member relative to said housing.

30. In a power transmission mechanism for a motor vehicle having driving and driven members, a clutch for operatively connecting said members, including a pressure plate rotating with the driving member and a driven plate connected to the driven member, an adjustable reaction element, centrifugal force responsive means reacting against said reaction element and acting against said pressure plate to urge the latter toward engagement with the driven plate, and fluid operated means adapted to adjust said reaction plate from a position wherein said centrifugal mechanism is operative to effect engagement and disengagement of the clutch, to a position wherein the clutch is engaged irrespective of centrifugal action.

31. In a power transmitting system for a motor vehicle having driving and driven members and including a change speed transmission having a driving range and a starting range, a clutch for operatively connecting said driving and driven members, said clutch including a pressure plate rotating with the driving member, a driven plate connected to the driven member and centrifugal force responsive means acting against the pressure plate for moving the same toward clutch engaging position, an adjustable reaction member against which said centrifugal means reacts, and fluid operated means acting against said reaction member and adapted, when the transmission is adjusted to the starting range, to move said reaction element to a position wherein said centrifugal means is operative to effect centrifugal engagement and disengagement of the clutch, and when the transmission is adjusted to the driving range, to move said reaction element to a position wherein the clutch is locked in engagement irrespective of centrifugal action.

32. In a power transmission system for a motor vehicle having driving and driven members, a clutch for connecting said members comprising a pressure plate rotating with the driving member and a driven plate connected to the driven member, an adjustable reaction member, centrifugal force responsive means reacting against said reaction member and engaging the pressure plate for moving the latter toward driving engagement with said driven plate, and fluid operated means adapted to move said reaction member from a first position wherein said centrifugal means is inoperative to effect engagement of the clutch, to an intermediate position wherein said centrifugal mechanism is operative to engage and disengage the clutch centrifugally, and to a third position wherein the clutch is locked in engagement irrespective of centrifugal action.

33. In a clutch system for a motor vehicle having driving and driven members, a clutch for operatively connecting said members, and control means including a fluid pump driven by said driving member, said control means further including a fluid pressure relief vent, a rotatable valve chamber driven by one of said members, a valve element in said chamber, arranged for movement in a path disposed at an angle to a tangent to the path of rotation of the center of gravity of said valve element, said valve element being responsive to centrifugal force developed within itself and adapted, under said centrifugal force to restrict said vent so as to effect the building up of pressure in the system for controlling clutch engagement, and, at reduced speeds, to effect the escape of fluid through said vent so as to reduce the pressure in the system for permitting clutch disengagement, a second pump, driven by said driven member, and means for conducting fluid under pressure from said second pump to said valve chamber in contact with said valve element for moving the same in a direction to supplement centrifugal force and effect clutch engagement irrespective of rotational speed of the members.

34. In a power transmission system for a motor vehicle having driving and driven members, a clutch for operatively connecting said members, a fluid motor operatively associated with said clutch, a pair of fluid pumps, one driven by the driving member and the other driven by the driven member, arranged to supply fluid under pressure to said motor for operating the clutch, and means for exerting control upon the pressure in said fluid motor, including means forming a rotatable valve chamber driven by one of said members and a radially movable centrifugal force-responsive valve element therein, adapted at low rotational speeds to effect the venting of fluid from said motor and at high rotational speeds to contribute to the maintaining of pressure in said motor.

35. In a power transmission for a motor vehicle having driving and driven members, mechanism for establishing a drive between said members, and a fluid system for controlling said mechanism, said system including a pair of fluid pumps, one driven by the driving member and the other driven by the driven member, arranged to supply fluid under pressure to said mechanism for operating the same, and means for exerting control upon the fluid pressure in said mechanism, including means forming a rotatable valve chamber driven by one of said members and a radially movable centrifugal force-responsive valve element therein.

36. In a power transmission for a motor vehicle having driving and driven members, mechanism for establishing a drive between said members and a fluid system for controlling said mechanism, said system including a pair of pumps driven by the driving and driven members respectively, arranged to supply fluid under pressure to said mechanism for operating the same, and means for exerting control upon the fluid pressure in said mechanism, said means comprising an operator controlled valve and a centrifugal valve, the latter valve including means forming a rotatable valve chamber driven by one of said members and a radially movable centrifugal force-responsive valve element therein, said valves being adapted, in one combination of positions, to relieve the fluid pressure, and in another combination of positions to maintain the fluid pressure.

37. In a power transmission system for a motor vehicle having driving and driven members, a clutch for operatively connecting said members, a fluid motor operatively associated with said clutch, a pair of pumps driven by the driving and driven members respectively, arranged to supply fluid under pressure to said fluid motor for operating the clutch, and means for exerting control upon the pressure in said fluid motor, said means including an operator-controlled valve and a centrifugal valve, the latter valve comprising means forming a rotatable valve chamber driven by one of said members and a radially movable centrifugal force-responsive valve element therein, said valves being adapted, in one combination of positions, to effect venting of said motor so as to relieve the pressure therein, and in another combination of positions, to maintain the pressure in said motor.

38. In a power transmission mechanism for a motor vehicle having driving and driven members, means to establish a drive between said members, and a fluid system for controlling said means, said system including a fluid motor, a pair of pumps, one driven by the driving member and the other driven by the driven member, for supplying fluid under pressure in said system, means providing a rotatable valve chamber driven by one of said members, a vent in said system for reducing the pressure therein, said vent communicating directly with said valve chamber, a centrifugal force-responsive valve element in said chamber, adapted under its within developed centrifugal force to restrict said vent so as to permit the pressure to build up in said motor, for establishing the drive, a second vent in said system for relieving the pressure therein, and an operator-controlled valve controlling said second vent.

39. In a power transmission mechanism for a motor vehicle having driving and driven members, a clutch for establishing a drive connection between said members, a pressure fluid system including a fluid motor for controlling the operation of said clutch, said system further including a pair of pumps rotatable in timed relationship to the rotation of said driving and driven members respectively, adapted to supply fluid under pressure in said system, means forming a valve chamber rotatable in timed relationship to the rotation of one of said members, a radially movable valve element in said chamber, a vent for said chamber, said valve element being movable, under centrifugal force developed within itself, to restrict said vent so as to permit pressure to build up in said system for effecting clutch engagement, a second vent in said system, an operator-controlled valve controlling said second vent, and a third valve in said system, responsive to fluid pressure, for assisting in the control of the fluid pressure in said fluid motor.

40. In a power transmission for a motor vehicle having driving and driven members, mechanism for establishing a drive between said members, and a fluid system for controlling said mechanism, said system including a pair of fluid pumps, one driven by the driving member and the other driven by the driven member, arranged to supply fluid under pressure to said mechanism for operating the same, and means for exerting control upon the fluid pressure in said mechanism, including means forming a rotatable valve chamber driven by one of said members and a centrifugal force-responsive valve element therein arranged for movement in a path disposed at an angle to a tangent to the path of rotation of its center of gravity so as to be responsive to its within developed centrifugal force for exerting said controlling effect.

41. In a power transmission for a motor vehicle having driving and driven members, mechanism for establishing a drive between said members and a fluid system for controlling said mechanism, said system including a pair of pumps driven by the driving and driven members respectively, arranged to supply fluid under pressure to said mechanism for operating the same, and means for exerting control upon the fluid pressure in said mechanism, said means comprising an operator-controlled valve and a centrifugal valve, the latter valve including means forming a rotatable valve chamber driven by one of said members and a centrifugal force-responsive valve element therein arranged for movement in a path disposed at an angle to a tangent to the path of rotation of its center of gravity so as to be responsive to its within developed centrifugal force for exerting said control, said valves being adapted, in one combination of positions, to relieve the fluid pressure, and in another combination of positions, to maintain the fluid pressure.

HAROLD NUTT.
HAROLD V. REED.